Feb. 6, 1923. 1,444,069
J. GYGER.
FLOW ACCELERATOR FOR PIPE LINE SAND CONVEYERS.
FILED JUNE 18, 1921.
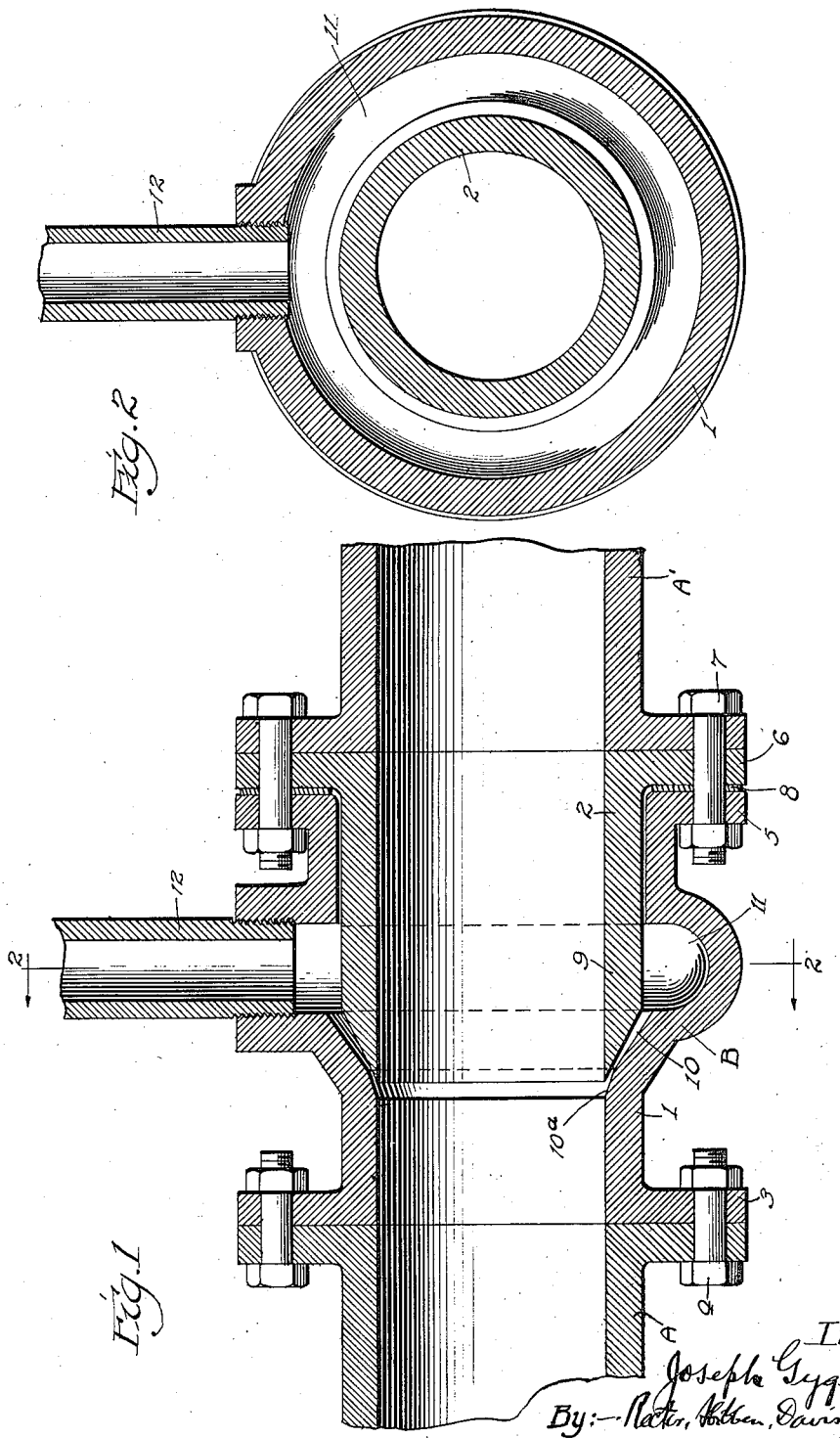

Patented Feb. 6, 1923.

1,444,069

UNITED STATES PATENT OFFICE.

JOSEPH GYGER, OF OTTAWA, ILLINOIS, ASSIGNOR TO OTTAWA SILICA COMPANY, OF OTTAWA TOWNSHIP, ILLINOIS, A CORPORATION OF ILLINOIS.

FLOW ACCELERATOR FOR PIPE-LINE SAND CONVEYERS.

Application filed June 18, 1921. Serial No. 478,774.

*To all whom it may concern:*

Be it known that I, JOSEPH GYGER, a citizen of the United States, residing at Ottawa, in the county of La Salle and State of Illinois, have invented certain new and useful Improvements in Flow Accelerators for Pipe-Line Sand Conveyers, of which the following is a specification.

My invention relates to a device which is intended to be applied to and form part of a pipe line for pumping sand or other granular material mingled with water to a semifluid condition from one point to another. The object of the invention is to reduce resistance to the flow of the material and facilitate its passage through the pipe, thus enabling the material to be transported more easily and to a greater distance. With the foregoing object and incidental advantage in the structural arrangement and construction of the parts of the device in view, I have devised and invented the improved accelerating or "boosting" device illustrated in the accompanying drawings and hereinafter more fully described, the essential elements of my invention being more particularly pointed out in the appended claims.

Of the drawing, Fig. 1 is a central longitudinal section of the device, and Fig. 2 a cross-section of the same on the line 2—2 of Fig. 2.

Like reference characters indicate like parts on both figures of the drawing.

It will be understood that my novel accelerator device is intended to be applied to pipe line pumping apparatus, the general construction and arrangement of which is old and well-known and forms no part of my invention. In such an installation the sand and water, mingled to a consistency permitting liquid flow, is forced in a solid stream by a suitable pump (not shown) through a line of connected piping,—say, for example, a line consisting of connected cast-iron pipe sections, five inches or so in diameter.

My novel accelerator is designed to be interposed in such a system at one or more points between adjacent pipe sections, as shown in Fig. 2, the ends of the pipe section being marked A A, and the accelerator device as a whole marked B.

Describing now the particular construction of the device as illustrated, it consists of sections having a flow passage of the same diameter as the pipe sections and secured to such pipe sections and to each other by bolts. The section 1 is formed with a bolting flange 3 through which it may be secured by bolts 4 to the pipe section A. This section 1 is chambered to receive the section 2, and at what may be termed its rear end is formed with a bolting flange 5, parallel with a flange 6 on the rear end of the section 2, the parts being secured together and to the pipe section A by means of bolts 7. Between the flanges 5 and 6 is interposed a gasket 8, forming a tight joint and of such thickness as to provide for a jet opening of just the right size between the sections 1 and 2. To provide this jet opening the forward end of the section 2 is exteriorly beveled at an acute angle to form the face 9, and the adjacent portion of the section 1 is provided with an internal inclined face 10 formed on a somewhat less acute angle, so that the annular space between the walls is greater at the rear, the extreme forward portion of the jet opening, being, however, in the present instance flared somewhat by cutting away the wall of the section 1 along the face $10^a$. The rear end of the jet passage so formed communicates with an annular chamber 11 formed by a channel in the section 1, and this chamber is supplied with water under pressure from a suitable source through a pipe 12 communicating with such chamber.

With the above described construction and arrangement of parts, it is obvious that the water forced under pressure through the jet opening of the device will enter in the pipe line in the form of an encircling sheath of water tending to reduce friction at the periphery of the current and accelerating its flow. Under given conditions it has in practice been found to nearly double the efficiency of the system, enabling the sand to be forced to a much greater distance, and delivering a far greater quantity of sand.

While I have described my invention in the best form known to me, it will be understood that changes in the formation and assemblage of the structural members may be made without departing from the substance and spirit of my invention, and I therefore desire to include within the scope of my claims all equivalents of the elements recited and all variations of form not affecting the substantial identity of the invention.

I claim:

1. In a pipe line conveyer provided with means for forcing a stream of mingled water and granular material therethrough, a sectional accelerator interposed in the line and comprising an outer section internally chambered, and an inner section making sealed connection with said outer section, said outer and inner sections being formed with adjacent substantially coinciding inclined faces arranged to provide an annular jet orifice, said outer section being formed with a relatively narrow annular channel communicating with the jet orifice passage, said channel having an inlet opening of a diameter substantially equal to the width of the channel.

2. In a pipe line conveyer provided with means for forcing a stream of mingled water and granular material therethrough, a sectional accelerator interposed in the line and comprising an outer section internally chambered, and an inner section making sealed connection with said outer section, said outer and inner sections being formed with adjacent substantially coinciding inclined faces arranged to provide an annular jet orifice, the inclined face of one of said sections being formed on a more acute angle than the face of the other section to provide faces converging toward the outlet of the jet passage, whereby the passage inlet at the channel is of greater width than the passage outlet, said outer section being formed with a relatively narrow annular channel communicating with the jet orifice passage, and said channel having an inlet opening of a diameter substantially equal to the width of the channel.

JOSEPH GYGER.